US012800122B2

(12) United States Patent
Yamamoto et al.

(10) Patent No.: US 12,800,122 B2
(45) Date of Patent: Nov. 17, 2026

(54) VEHICLE LAMP

(71) Applicant: Koito Manufacturing Co., Ltd., Tokyo (JP)

(72) Inventors: Hiroki Yamamoto, Shizuoka (JP); Motohiro Komatsu, Shizuoka (JP); Keisuke Noda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 19/230,765

(22) Filed: Jun. 6, 2025

(65) Prior Publication Data

US 2025/0297719 A1 Sep. 25, 2025

Related U.S. Application Data

(63) Continuation of application No. PCT/JP2023/043075, filed on Dec. 1, 2023.

(30) Foreign Application Priority Data

Dec. 7, 2022 (JP) ................................ 2022-195849

(51) Int. Cl.
*F21S 41/40* (2018.01)
*B60Q 1/14* (2006.01)
*F21W 102/155* (2018.01)

(52) U.S. Cl.
CPC ............ *F21S 41/40* (2018.01); *B60Q 1/1423* (2013.01); *B60Q 2300/132* (2013.01); *F21W 2102/155* (2018.01)

(58) Field of Classification Search
CPC . F21S 41/40; B60Q 1/1423; B60Q 2300/132; F21W 2102/155
See application file for complete search history.

(56) References Cited

U.S. PATENT DOCUMENTS

2006/0023461 A1* 2/2006 Knight .................. F21S 41/143 362/466
2007/0165416 A1* 7/2007 Ishida .................. G01M 11/062 362/487

(Continued)

FOREIGN PATENT DOCUMENTS

EP 3957902 A1 2/2022
WO 2021/180692 A1 9/2021

(Continued)

OTHER PUBLICATIONS

International Preliminary Report on Patentability (Form PCT/IB/373) and the Written Opinion of the International Searching Authority (Form PCT/ISA/237) issued on Jun. 10, 2025, by the International Bureau of WIPO in corresponding International Application No. PCT/JP2023/043075. (8 pages).

(Continued)

*Primary Examiner* — Leah Macchiarolo
(74) *Attorney, Agent, or Firm* — Buchanan Ingersoll & Rooney PC

(57) ABSTRACT

A lamp has a plurality of independently luminance-controllable pixels arranged in a matrix. The lamp illuminates a first area that contains a cutoff line in a low beam light distribution, with a first beam having an intensity distribution ascribed to a luminance distribution of the plurality of pixels. A fixed light distribution lamp covers a second area that contains a lower end of the low beam light distribution, and illuminates the second area with a second beam having a fixed intensity distribution. A controller sets a predetermined luminance distribution independent of a pitch angle of a vehicle body to the plurality of pixels of the lamp, and changes a position of the cutoff line according to the pitch angle, so as to turn off at least one pixel that corresponds to an area above the cutoff line.

6 Claims, 5 Drawing Sheets

(56) References Cited

U.S. PATENT DOCUMENTS

| | | | | |
|---|---|---|---|---|
| 2018/0372303 | A1* | 12/2018 | Na | F21S 41/333 |
| 2019/0118700 | A1* | 4/2019 | Lee | B60Q 1/143 |
| 2021/0148536 | A1 | 5/2021 | Roels et al. | |
| 2023/0019153 | A1 | 1/2023 | Maruyama et al. | |
| 2023/0098917 | A1 | 3/2023 | Mochizuki et al. | |
| 2023/0142677 | A1 | 5/2023 | Sugimoto | |
| 2023/0311744 | A1 | 10/2023 | Yamamoto et al. | |

FOREIGN PATENT DOCUMENTS

| | | | |
|---|---|---|---|
| WO | 2021/182151 | A1 | 9/2021 |
| WO | 2021/193702 | A1 | 9/2021 |
| WO | 2021/200701 | A1 | 10/2021 |
| WO | 2022/131044 | A1 | 6/2022 |
| WO | 2022/157339 | A1 | 7/2022 |
| WO | 2022/220187 | A1 | 10/2022 |

OTHER PUBLICATIONS

International Search Report (Form PCT/ISA/210) issued on Jan. 30, 2024, by the Japanese Patent Office in corresponding International Application No. PCT/JP2023/043075. (6 pages).

Extended European Search Report issued on Mar. 11, 2026, in corresponding European Patent Application No. 23900569.7. (11 pages).

* cited by examiner

VEHICLE LAMP

BACKGROUND

1. Technical Field

The present disclosure relates to a vehicle lamp.

2. Description of the Related Art

Light distribution pattern of vehicle headlamp is regulated by law, so as not to cause glare to nearby traffic participants. A vehicle body will have front-rear inclination that varies depending on the number of passengers and the weight of baggage. This varies inclination of the optical axis of the headlamp relative to the road face (ground face), whereby the illumination range of the headlamp shifts up and down. Upward shift of the illumination range would cause the glare, meanwhile downward shift would narrow the illumination range ahead of the vehicle.

The headlamp therefore has a built-in leveling actuator, aimed at correcting shift of the optical axis of the headlamp according to changes in the front-rear inclination of the vehicle body. A technology called auto-leveling has been known, which automatically controls the leveling actuator according to the inclination of the vehicle body. The auto-leveling is designed to acquire front-rear inclination of the vehicle body with use of a vehicle-borne sensor, and to use the actuator to correct the optical axis of a lamp unit in the headlamp, so as to cancel the inclination.

Prior auto-leveling has been designed while focused on meeting the regulations that prohibit causing glare to nearby traffic participants, while leaving glare associated with sudden vibration of the traveling vehicle body acceptable in most cases.

SUMMARY

The present disclosure has been made considering such situation, wherein exemplary one of the objects thereof is to provide a lamp system capable of providing good field of view regardless of changes in the vehicle posture.

A vehicle lamp according to one embodiment of the present disclosure includes: an adaptive driving beam lamp having a plurality of independently luminance-controllable pixels arranged in a matrix, and being structured to illuminate a first area that contains a cutoff line in a low beam light distribution, with a first beam having an intensity distribution ascribed to a luminance distribution of the plurality of pixels; a fixed light distribution lamp structured to cover a second area that contains a lower end of the low beam light distribution, and to emit a second beam having a fixed intensity distribution; and a controller structured to set a predetermined luminance distribution independent of a pitch angle of a vehicle body to the plurality of pixels of the adaptive driving beam lamp, and to change a position of the cutoff line according to the pitch angle, so as to turn off at least one pixel that corresponds to an area above the cutoff line.

Another embodiment of the present disclosure relates to a controller of a vehicle lamp. The vehicle lamp includes: an adaptive driving beam lamp having a plurality of independently luminance-controllable pixels arranged in a matrix, and being structured to illuminate a first area that contains a cutoff line in a low beam light distribution, with a first beam having an intensity distribution ascribed to a luminance distribution of the plurality of pixels; and a fixed light distribution lamp structured to cover a second area that contains a lower end of the low beam light distribution, and to emit a second beam having a fixed intensity distribution. The controller is structured to set a predetermined luminance distribution independent of a pitch angle of a vehicle body to the plurality of pixels of the adaptive driving beam lamp, and to change a position of the cutoff line according to the pitch angle, so as to turn off at least one pixel that corresponds to an area above the cutoff line.

Note that also free combinations of these constituents, and also any of the constituents and expressions exchanged among the method, apparatus, and system, are valid as the modes of the present disclosure. Also note that the description of this section (SOLUTION TO PROBLEM) does not describe all essential features of the invention, and thus also subcombinations of these features described may constitute the invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
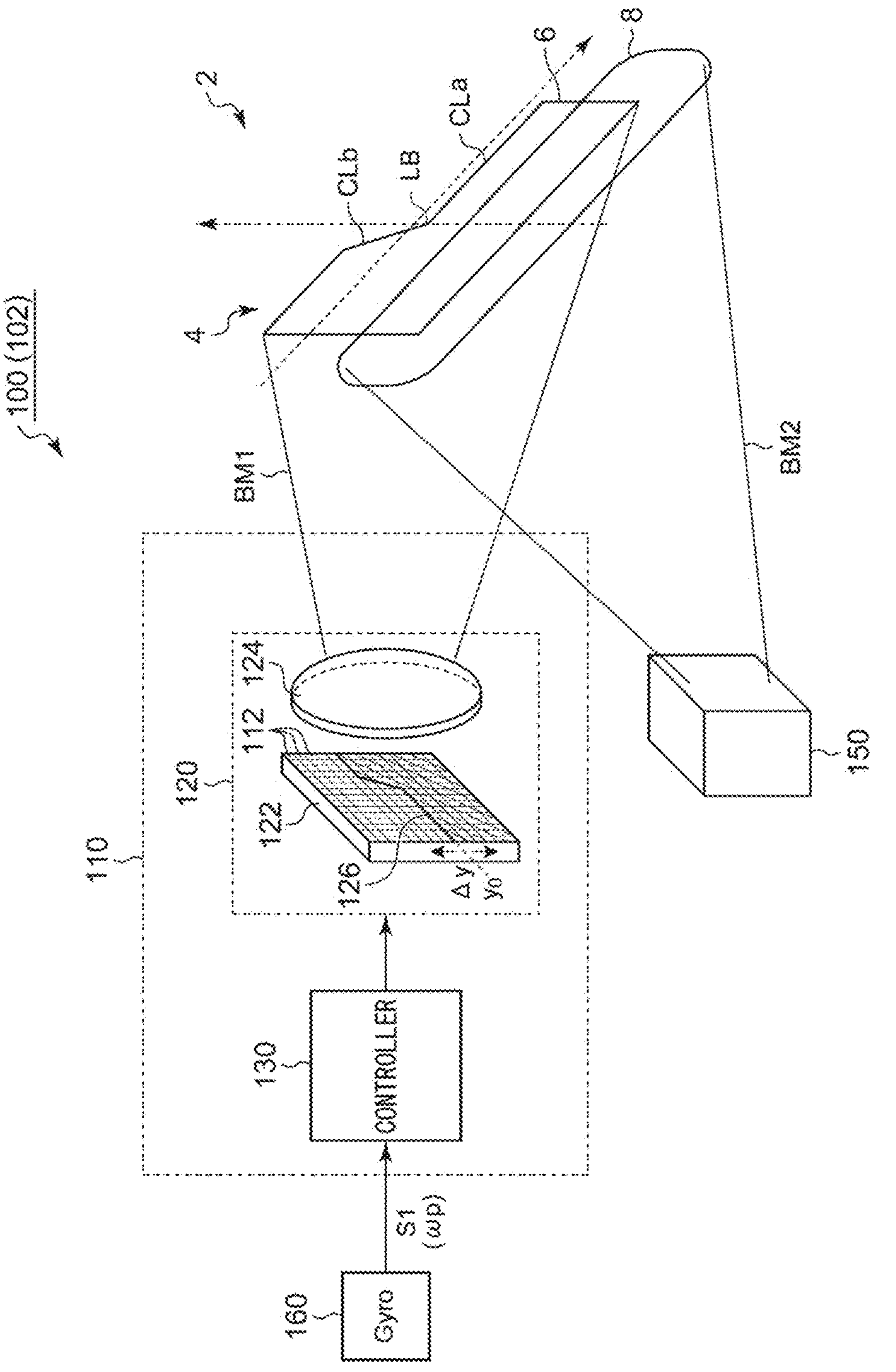
FIG. 1 is a block diagram illustrating a lamp system according to one embodiment.

Some exemplary embodiments of the present disclosure will be outlined. This outline is intended for briefing some concepts of one or more embodiments, for the purpose of basic understanding of the embodiments, as an introduction before detailed description that follows, without limiting the scope of the invention or disclosure. Also note this outline is not an extensive overview of all possible embodiments, and is therefore not intended to limit any constituent indispensable for the embodiments. For convenience, the wording "one embodiment" may be used to designate a single embodiment (Example or Modified Example), or a plurality of embodiments (Examples or Modified Examples) disclosed in the present specification.

A vehicle lamp according to one embodiment includes: an adaptive driving beam lamp having a plurality of independently luminance-controllable pixels arranged in a matrix, and being structured to illuminate a first area that contains a cutoff line in a low beam light distribution, with a first beam having an intensity distribution ascribed to a luminance distribution of the plurality of pixels; a fixed light distribution lamp structured to cover a second area that contains a lower end of the low beam light distribution, and to emit a second beam having a fixed intensity distribution; and a controller structured to set a predetermined luminance distribution independent of a pitch angle of a vehicle body to the plurality of pixels of the adaptive driving beam lamp, and to change a position of the cutoff line according to the pitch angle, so as to turn off at least one pixel that corresponds to an area above the cutoff line.

With this structure, glare in case of vehicle sink on the rear side (nose-up) may be prevented, by descending the cut-off line, meanwhile far field of view in case of vehicle sink on the front side (nose-dive) may be prevented from dimming, by elevating the cut-off line. In addition, with the control made adaptive to dynamic changes in the pitch angle of the vehicle body, the level of the cut-off line may be kept constant on a virtual perpendicular screen ahead of the vehicle, even if the vehicle body causes front-rear vibration, thereby preventing an object ahead of the vehicle from being looked bright and dark, and thus successfully providing an improved field of view. Furthermore, the intensity distribution of a part where the first beam and the second beam overlap is kept constant regardless of the pitch angle, thus making it possible to prevent flickering. Accordingly this invention can provide a good field of view regardless of changes in the vehicle posture.

In one embodiment, the controller may store a first image having the number of pixels in a horizontal direction equal to the number of pixels in a horizontal direction of the plurality of pixels, and the number of pixels in a vertical direction equal to the number of pixels in a vertical direction of the plurality of pixels, and having a predetermined luminance distribution mapped thereon; and a second image having the number of pixels in the horizontal direction equal to the number of pixels in the horizontal direction of the plurality of pixels, and the number of pixels in the vertical direction larger than the number of pixels in the vertical direction of the plurality of pixels, and having an area above the cutoff line filled with a first value, and an area below the cutoff line filled with a second value. The controller may select a part that corresponds to the pitch angle, from the second image to create a third image, and may arithmetically process the third image and the first image, to create a fourth image to be set on the adaptive driving beam lamp.

EMBODIMENTS

Preferred embodiments will be explained below, referring to the attached drawings. All similar or equivalent constituents, members and processes illustrated in the individual drawings will be given same reference signs, so as to properly avoid redundant explanations. The embodiments are merely illustrative, and are not restrictive about the disclosure. All features and combinations thereof described in the embodiments are not always essential to the disclosure.

FIG. 1 is a block diagram illustrating a lamp system 100 according to one embodiment. The lamp system 100 is mounted on an automobile, and functions as a headlamp structured to illuminate a field of view ahead of the vehicle. A part of, or the entire of the lamp system 100 constitutes a vehicle lamp 102.

The automobile can vary the angle of inclination in the front-rear direction, depending on front-rear weight balance or vehicle motion. The angle of inclination in the front-rear direction corresponds to pitching about a horizontal axis (pitch axis) that extends in the left-right direction of the vehicle body, and is referred to as pitch angle $\theta p$.

The lamp system 100 has a function that automatically adjusts an optical axis of the headlamp in the pitching direction, according to the pitch angle $\theta p$ (auto-leveling function).

The lamp system 100 has an adaptive driving beam lamp 110, a fixed light distribution lamp 150, and an inclination sensor 160.

The adaptive driving beam lamp 110 and the fixed light distribution lamp 150 illuminate different areas in the low beam light distribution. FIG. 1 schematically illustrates a virtual perpendicular screen 2, on which a low beam light distribution 4 is schematically illustrated.

The adaptive driving beam lamp 110 covers a first area 6 that contains a cutoff line (upper end) CL, in the upper part of the low beam light distribution 4. On the other hand, the fixed light distribution lamp 150 covers a second area 8 that contains a lower end of the low beam light distribution 4. The second area 8 is referred to as a diffused low beam light distribution. The first are 6 and the second area 8 are overlapped. The cutoff line CL contains a horizontal cutoff line CLa and an oblique cutoff line CLb, which intersect at an elbow point LB.

Note that the adaptive driving beam lamp 110 also serves as a light source for high beam illumination, and also functions as a so-called ADB lamp.

The adaptive driving beam lamp 110 has a high-definition lamp unit 120 and a controller 130. The high-definition lamp unit 120 contains a light-emitting element array 122, and an illumination optical system 124. The light-emitting element array 122 contains a plurality of pixels PIX arranged in a matrix. Luminance of the individual pixels PIX are independently controllable at multiple gradation levels. The light-emitting element array 122 usable herein may be an LED array.

The controller 130 controls the luminance of the plurality of pixels PIX of the light-emitting element array 122. The illumination optical system 124 projects an output light from the light-emitting element array 122, ahead of the vehicle. The illumination optical system 124 may be a lens optical system, a reflective optical system, or a combination of these systems.

Note that correspondence between a position of a certain pixel and an illumination area on the virtual perpendicular screen 2 ascribed to the pixel is determined by the illumination optical system 124, and may be occasionally given in a mirror image relation (left-right inversion), up-down inversion, or up-down and left-right inversion.

The high-definition lamp unit 120 illuminates a first area 6 that contains the cutoff line CL in the low beam light distribution 4, with a first beam BM1 having an intensity distribution ascribed to a luminance distribution of the plurality of pixels PIX.

The fixed light distribution lamp 150 covers a second area 8 that contains a lower end of the low beam light distribution 4 and overlaps a part of the first area 6, and illuminates the second area 8 with a second beam BM2 having a fixed intensity distribution.

Figure 2:
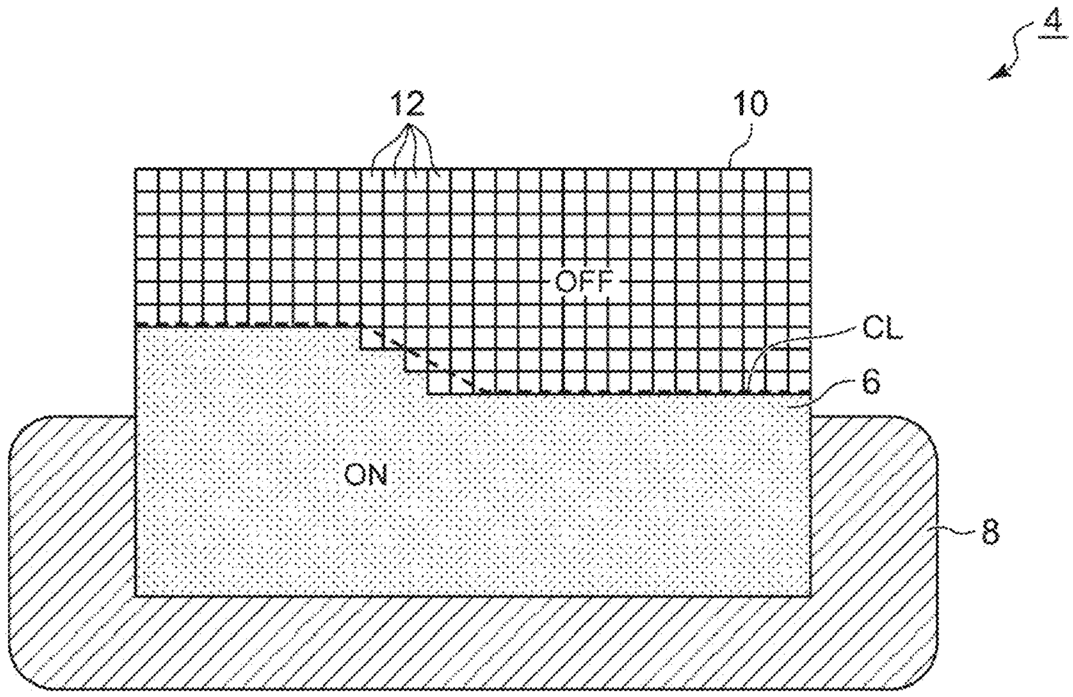
FIG. 2 is a diagram illustrating formation of a low beam light distribution by the lamp system illustrated in FIG. 1.

FIG. 2 is a diagram for explaining formation of the low beam light distribution 4 by the lamp system 100 illustrated in FIG. 1. A rectangle indicates the illuminatable range 10 by the adaptive driving beam lamp 110. The illuminatable range 10 is divided into a plurality of meshes (sub-regions) 12 that correspond to the plurality of pixels PIX. Illuminance of each mesh 12 is ascribed to the luminance of the corresponding pixel PIX.

With all the pixels of the light-emitting element array 122 turned on, all the meshes 12 in the illuminatable range 10 are illuminated with the first beam BM1. With a part of the pixels PIX of the light-emitting element array 122 turned off, the illuminance of the mesh 12 that corresponds to such pixel will be substantially zero. Note that the pixel PIX being turned off is not limited to a case where the luminance is zero, that is, a case where the illuminance of the corresponding mesh 12 is zero, but may include a case where the luminance is very small, that is, a case where the illuminance of the corresponding mesh 12 is not zero but is very small.

The controller 130 turns off the pixels corresponding to the meshes 12 above the cutoff line CL, meanwhile turns on the pixels corresponding to the meshes 12 below the cutoff line CL, to form the first area 6 that contains the cutoff line CL in the low beam light distribution 4.

The first area 6 below the cutoff line CL has an illuminance which is not uniform but with a certain distribution. This will be described later.

Referring now back to FIG. 1, the inclination sensor 160 is structured to detect an angle of rotation (pitch angle) about the pitch axis of the vehicle body. The controller 130 can generate the pitch angle θp of the vehicle body, with reference to an output S1 of the inclination sensor 160. For example, the inclination sensor 160 usable herein may be a gyro sensor. The controller 130 can generate the pitch angle θp, by integrating angular velocity ωp about the pitch axis generated by the gyro sensor. The inclination sensor 160 may be provided in a housing of the headlamp, or may be externally attached to the housing of the headlamp. Alternatively, the inclination sensor 160 may be provided to the vehicle body.

In this embodiment, the controller 130 corrects position of the cutoff line CL in the low beam light distribution 4 in a dynamic and adaptive manner, according to fluctuation of the pitch angle θp ascribed to various factors during stop and travel of the vehicle.

The controller 130 sets a predetermined luminance distribution independent of the pitch angle θp of the vehicle body, to the plurality of pixels PIX of the light-emitting element array 122. The controller 130 also shifts the position in the height direction of a boundary 126 between an on-pixel region and an off-pixel region among the plurality of pixels PIX, so that the position of the cutoff line CL will be variable according to the pitch angle θp.

The structure of the lamp system 100 has been described above.

Figure 3:
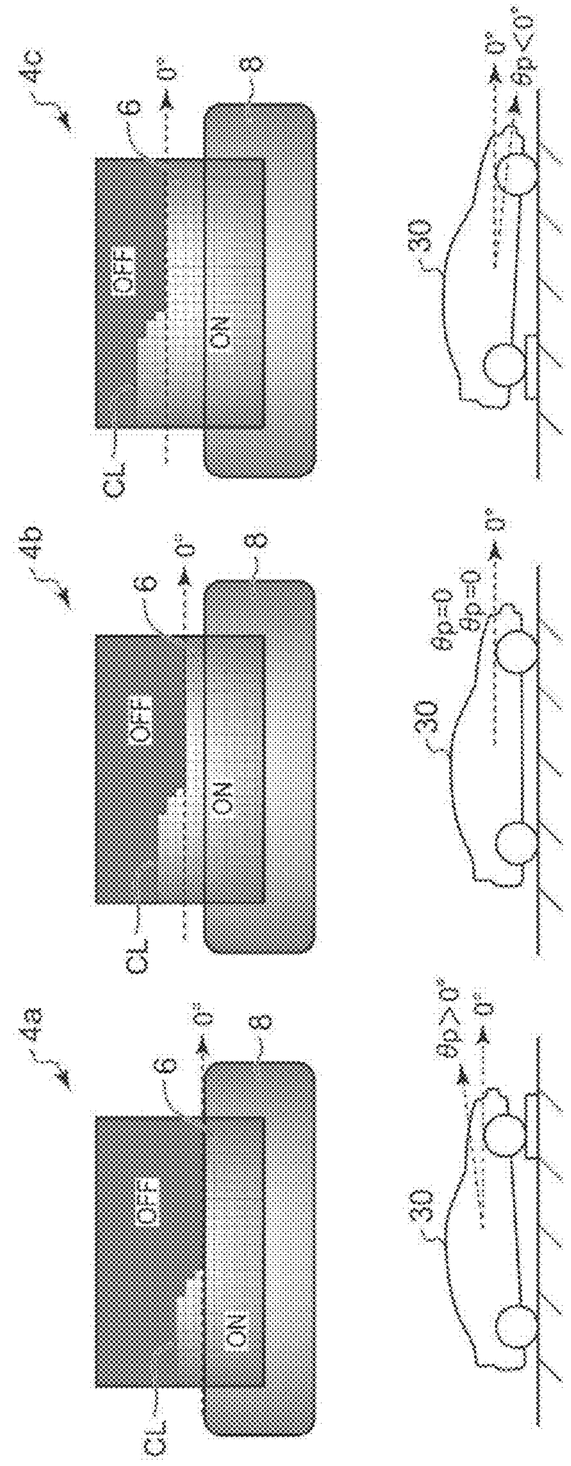
FIG. 3 is a diagram for explaining control of low beam light distribution, according to fluctuation of pitch angle $\theta p$.

FIG. 3 is a diagram for explaining control of the low beam light distribution 4, according to fluctuation of a pitch angle θp. FIG. 3 illustrates, on the left thereof, a low beam light distribution **4*a* of the vehicle body 30 in a nose-up posture (θp>0°). FIG. 3 illustrates, at the center thereof, a low beam light distribution 4*b* of the vehicle body 30 with no inclination (θp=0°). FIG. 3 illustrates, on the right thereof, a low beam light distribution 4*c* of the vehicle body 30** in a nose-dive posture (θp<0°). The numeral 0° indicates an angle horizontal to the road face. Shading in the diagram represents the illuminance of the individual meshes.

The second area 8 formed by the fixed light distribution lamp 150 shifts up and down as the pitch angle θp changes, relative to the horizontal level at 0°. Meanwhile, the first area 6 is formed by the adaptive driving beam lamp 110 so as to keep the level of height of the cutoff line CL close to the horizontal level at 0° (specifically, −0.57°) even if the pitch angle θp would change, for which the position of the boundary between the on-pixel region and the off-pixel region among the plurality of pixels PIX is controlled.

On the other hand, the plurality of pixels PIX have set thereon a predetermined luminance distribution independent of the pitch angle θp of the vehicle body 30. Therefore, if focused on one pixel in the on-pixel region, the pixel keeps the luminance constant regardless of the pitch angle θp, thus making the illuminance of each mesh kept constant regardless of the pitch angle θp.

The operation of the lamp system 100 has been described above.

With this lamp system 100, the cutoff line CL is controlled so as to keep a substantially horizontal level, even if the vehicle body is in the nose-up or nose-dive posture. This successfully provides the driver with a good field of view.

The lamp system 100 further has the following advantages. Referring now to FIG. 3, a focus will now be placed on an overlap region between the first area 6 and the second area 8. The overlap region, if the illuminance fluctuates therein according to the pitch angle θp, would be recognized by the driver undesirably as an uneven light distribution.

In this embodiment, the first area 6 and the second area 8 will have constant illuminance distribution in the overlap region, regardless of the pitch angle θp. Hence, the illuminance distribution (or illuminance) in the overlap region will not fluctuate, even if the pitch angle θp fluctuates. This successfully suppresses the uneven light distribution.

Next, an exemplary processing of the controller 130 will be described.

Figure 4:
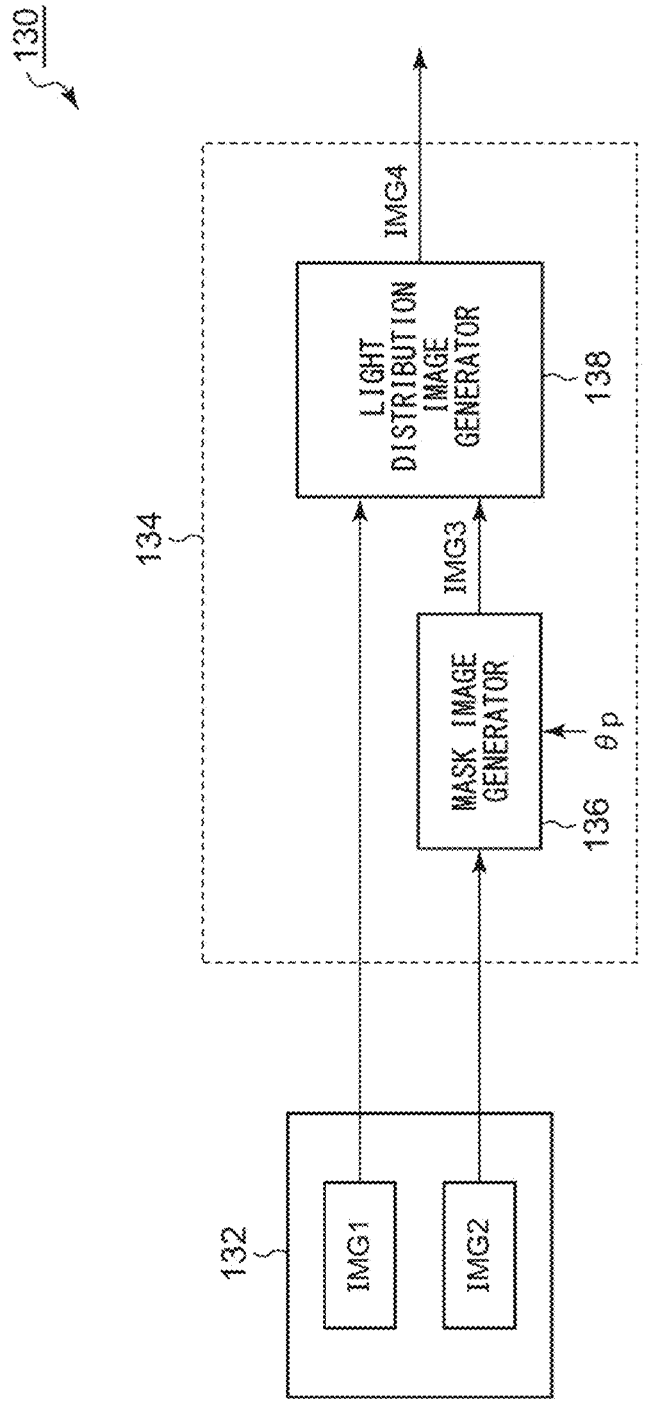
FIG. 4 is a functional block diagram of a controller.

FIG. 4 is a functional block diagram of the controller 130. The controller 130 has a memory 132 and an arithmetic processor 134. The memory 132 stores a first image IMG1 and a second image IMG2. The first image IMG1 has the number of pixels in the horizontal direction equal to the number of pixels in the horizontal direction of the light-emitting element array 122, and the number of pixels in the vertical direction equal to the number of pixels in the vertical direction of the light-emitting element array 122. The first image IMG1 has mapped thereon a predetermined luminance distribution. The first image IMG1 is also referred to as a base light distribution image.

The second image IMG2 has the number of pixels in the horizontal direction equal to the number of pixels in the horizontal direction of the light-emitting element array 122, and the number of pixels in the vertical direction larger than the number of pixels in the vertical direction of the light-emitting element array 122. The second image IMG2 has an area above the cutoff line CL filled with a first value (0, for example), and has an area below filled with a second value (1, for example).

A mask image generator 136 selects a part that corresponds to the pitch angle θp, from the second image IMG2 to create a third image IMG3. The third image IMG3 is also referred to as a mask image. The third image IMG3 has the numbers of pixels in the horizontal and vertical directions, equal to the numbers of pixels in the horizontal and vertical directions of the light-emitting element array 122, respectively.

A light distribution image generator 138 arithmetically processes the third image IMG3 and the first image IMG1, to generate a fourth image IMG4 to be set on the light emitting element array 122 of the adaptive driving beam lamp 110. The fourth image IMG4 is also referred to as a light distribution image.

Figure 5:
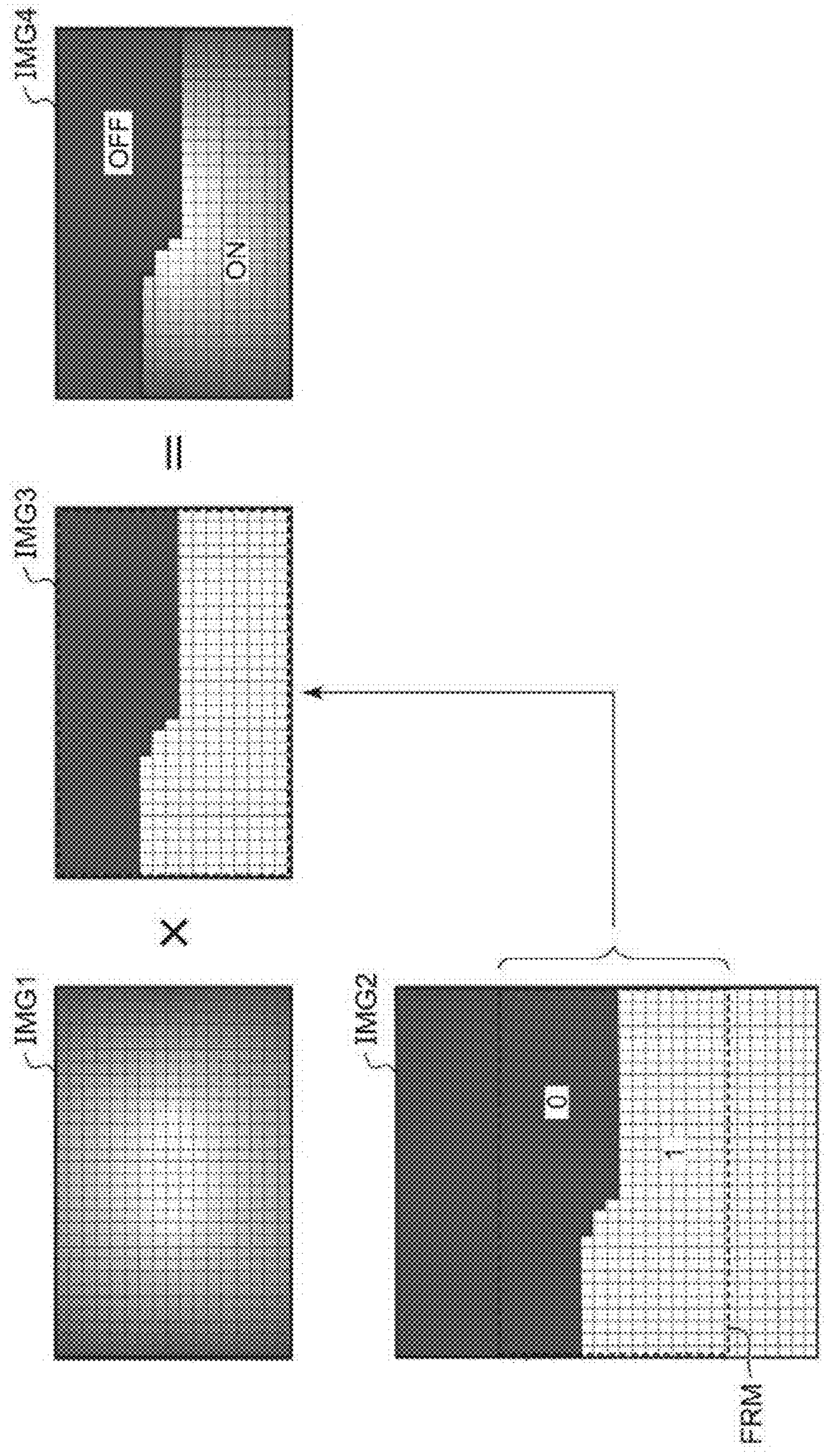
FIG. 5 is a diagram for explaining arithmetic processing by the controller illustrated in FIG. 4.

FIG. 5 is a diagram for explaining the processing by the controller 130 illustrated in FIG. 4. The first image IMG1 has a predetermined luminance distribution more brighter towards the center, and more darker towards the outer circumference. The second image IMG2 has an area above the cutoff line CL filled with the first value 0, and has an area below the cutoff line CL filled with the second value 1.

The mask image generator 136 applies a frame FRM to the second image IMG2, and outputs the pixels within the frame as the third image IMG3. The position of the frame FRM in the height direction is controlled according to the pitch angle θp. More specifically, the larger the pitch angle θp (θp>0°), the more the position of the frame FRM moves upwards, meanwhile, the smaller the pitch angle θp (θ<0°), the more the position of the frame FRM moves downwards.

A light distribution image generator 138 arithmetically processes the first image IMG1 and the third image IMG3, to generate the fourth image IMG4. For example, the light distribution image generator 138 replaces each pixel in the first image IMG1 with zero (or a sufficiently small value), if the corresponding pixel in the third image IMG3 has a value of zero. The light distribution image generator 138 may alternatively generate the fourth image IMG4, with use of the equation below.

$$IMG4(x,y)=IMG1(x,y)\times IMG3(x,y)$$

MODIFIED EXAMPLE

Although the embodiments employed a gyro sensor as the inclination sensor 160, the present disclosure is not limited thereto. The inclination sensor 160 may alternatively be a pair of vehicle height sensors attached to the front and rear of the vehicle body.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A vehicle lamp comprising:

an adaptive driving beam lamp having a light emitting diode (LED) array including a plurality of independently luminance-controllable LEDs arranged in a matrix, and being structured to illuminate, in a low beam mode, a first area that contains a cutoff line in a low beam light distribution, with a first beam ascribed to a luminance distribution of the LED array;

a fixed light distribution lamp which is separate from the adaptive driving beam lamp and is structured to cover a second area that contains a lower end of the low beam light distribution, and to illuminate, in the low beam mode, the second area with a second beam having a fixed light distribution; and a controller structured to, in the low beam mode, set a predetermined luminance distribution independent of a pitch angle of a vehicle body to the LED array of the adaptive driving beam lamp, and to change a position of the cutoff line according to the pitch angle, so as to turn off at least one LED that corresponds to an area above the cutoff line.

2. The vehicle lamp according to claim 1, wherein the controller stores:

a first image having the number of pixels in a horizontal direction equal to the number of the plurality of LEDS in a horizontal direction of the LED array, and the number of pixels in a vertical direction equal to the number of the plurality of LEDS in a vertical direction of the LED array, and having a predetermined luminance distribution mapped thereon; and a second image having the number of pixels in the horizontal direction equal to the number of the plurality of LEDS in the horizontal direction of the LED array, and the number of pixels in the vertical direction larger than the number of the plurality of LEDS in the vertical direction of the LED array, and having an area above the cutoff line filled with a first value, and an area below the cutoff line filled with a second value, the controller being structured to select a part that corresponds to the pitch angle, from the second image to create a third image, and to arithmetically process the third image and the first image, to create a fourth image to be set on the adaptive driving beam lamp.

3. The vehicle lamp according to claim 1, wherein the controller is structured to set an overlap area between the first area and the second area to a constant illuminance distribution independent of the pitch angle of the vehicle body.

4. A controller for controlling an adaptive driving beam lamp used in combination with a fixed light distribution lamp, wherein the adaptive driving beam lamp has a light emitting diode (LED) array including a plurality of independently luminance-controllable LEDs arranged in a matrix, and is structured to illuminate, in a low beam mode, a first area that contains a cutoff line in a low beam light distribution, with a first beam ascribed to a luminance distribution of the LED array;

a fixed light distribution lamp is separate from the adaptive driving beam lamp and is structured to cover a second area that contains a lower end of the low beam light distribution, and to illuminate, in the low beam mode, the second area with a second beam having a fixed light distribution;

the controller being structured to, in the low beam mode, set a predetermined luminance distribution independent of a pitch angle of a vehicle body to the LED array of the adaptive driving beam lamp, and to change a position of the cutoff line according to the pitch angle, so as to turn off at least one LED that corresponds to an area above the cutoff line.

5. The controller according to claim 4, being structured to store:

a first image having the number of pixels in a horizontal direction equal to the number of the plurality of LEDS in a horizontal direction of the LED array, and the number of pixels in a vertical direction equal to the number of the plurality of LEDS in a vertical direction of the LED array, and having a predetermined luminance distribution mapped thereon; and a second image having the number of pixels in the horizontal direction equal to the number of the plurality of LEDS in the horizontal direction of the LED array, and the number of pixels in the vertical direction larger than the number of the plurality of LEDS in the vertical direction of the LED array, and having an area above the cutoff line filled with a first value, and an area below the cutoff line filled with a second value, the controller being structured to select a part that corresponds to the pitch angle, from the second image to create a third image, and to arithmetically process the third image and the first image, to create a fourth image to be set on the adaptive driving beam lamp.

6. The controller according to claim 4, wherein the controller is structured to set an overlap area between the first area and the second area to a constant illuminance distribution independent of the pitch angle of the vehicle body.

* * * * *